United States Patent
Schneider et al.

[11] Patent Number: 5,807,037
[45] Date of Patent: Sep. 15, 1998

[54] TOOL HEAD FOR MACHINE-TOOLS

[75] Inventors: Eberhardt Schneider, Besigheim; Gerhard Scheer, Löchgau, both of Germany

[73] Assignee: Komet Praezisionswerkzeuge Robert Breuning GmbH, Besigheim, Germany

[21] Appl. No.: 615,302

[22] PCT Filed: Jul. 12, 1994

[86] PCT No.: PCT/EP94/02273

§ 371 Date: Mar. 13, 1996

§ 102(e) Date: Mar. 13, 1996

[87] PCT Pub. No.: WO95/07785

PCT Pub. Date: Mar. 23, 1995

[30] Foreign Application Priority Data

Sep. 13, 1993 [DE] Germany .......................... 43 30 822.8

[51] Int. Cl.⁶ .................................................. B23B 25/06
[52] U.S. Cl. ..................... 408/147; 408/153; 408/179; 408/181
[58] Field of Search .................... 408/147, 153, 408/179, 181, 163

[56] References Cited

U.S. PATENT DOCUMENTS

| | | | |
|---|---|---|---|
| 3,198,037 | 8/1965 | Yogus | 408/153 |
| 3,526,159 | 9/1970 | Robinson et al. | 408/147 |
| 3,533,195 | 10/1970 | Schumann et al. | 408/147 X |
| 3,710,659 | 1/1973 | Pagelia et al. | |
| 4,847,975 | 7/1989 | Santi | 408/158 X |
| 5,251,511 | 10/1993 | Muendlein et al. | 408/181 X |

FOREIGN PATENT DOCUMENTS

| | | |
|---|---|---|
| 1 193 768 | 5/1965 | Germany . |
| 27 28 975 | 1/1979 | Germany . |
| 29 35 178 | 3/1981 | Germany . |
| 33 03 994 | 8/1983 | Germany . |
| 34 16 217 | 7/1989 | Germany . |
| 37 26 276 | 9/1990 | Germany . |
| 284176 | 11/1990 | Germany ............................ 408/181 |
| 39 42 219 | 2/1991 | Germany . |
| WO 91/03345 | 3/1991 | WIPO . |

*Primary Examiner*—A. L. Pitts
*Assistant Examiner*—Henry W. H. Tsai
*Attorney, Agent, or Firm*—Flynn, Thiel, Boutell & Tanis, P.C.

[57] ABSTRACT

A tool head, in particular a fine adjustment head for use in machine-tools, may be coupled to a rotary machine spindle (26) and has a slide (16) that may be adjusted transversely to the axis (12) of the base body and is provided with a projecting tool-receiving part (14) on its front face. A measurement arrangement (18) is provided for directly measuring the adjustment path of the slide (16) in relation to the base body (10). The tool head further has an adjustment motor (20) that acts on the slide (16) in the direction of adjustment and an external current supply arrangement (22) for electronic components integrated into the tool head and for the adjustment motor (20). In order to obtain a compact design with high adjustment precision, the adjustment motor (20) is arranged with its cylindrical housing (45) in a recess (46) of the base body (10) that extends transversely to the direction of adjustment of the slide (45) and to the axis of the base body. The recess (46) extends across the axis (12) of the base body and the driven shaft (48) of the motor extends parallel to the recess (46).

23 Claims, 3 Drawing Sheets

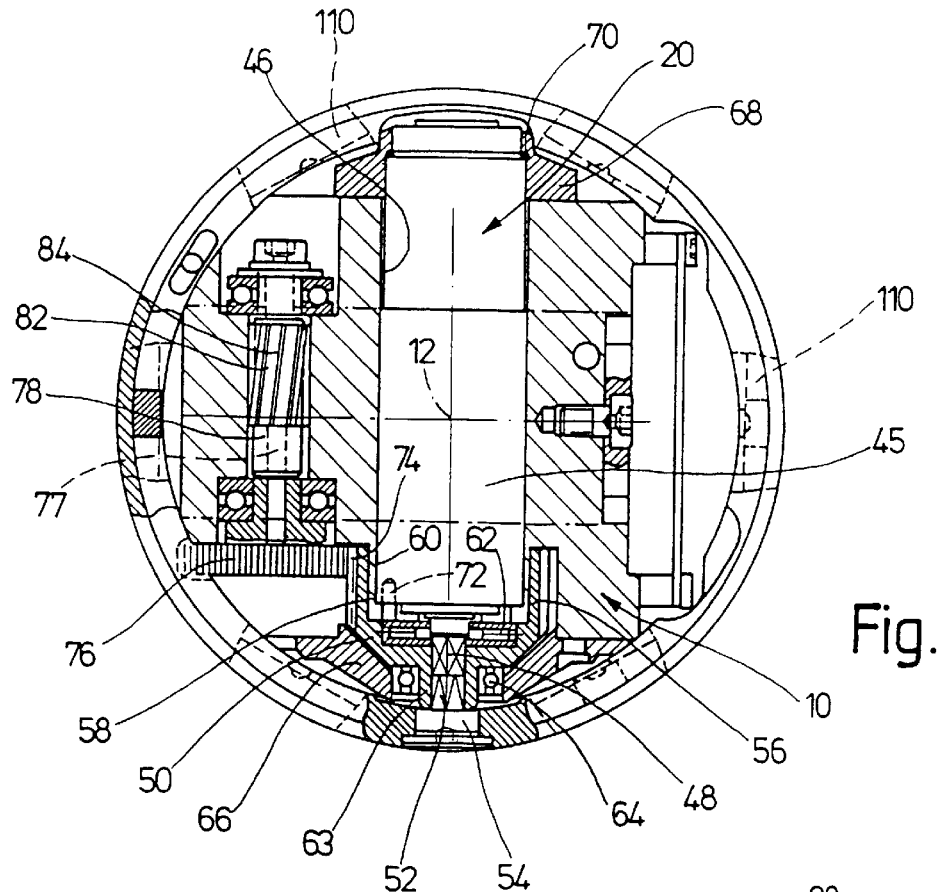
Fig. 4
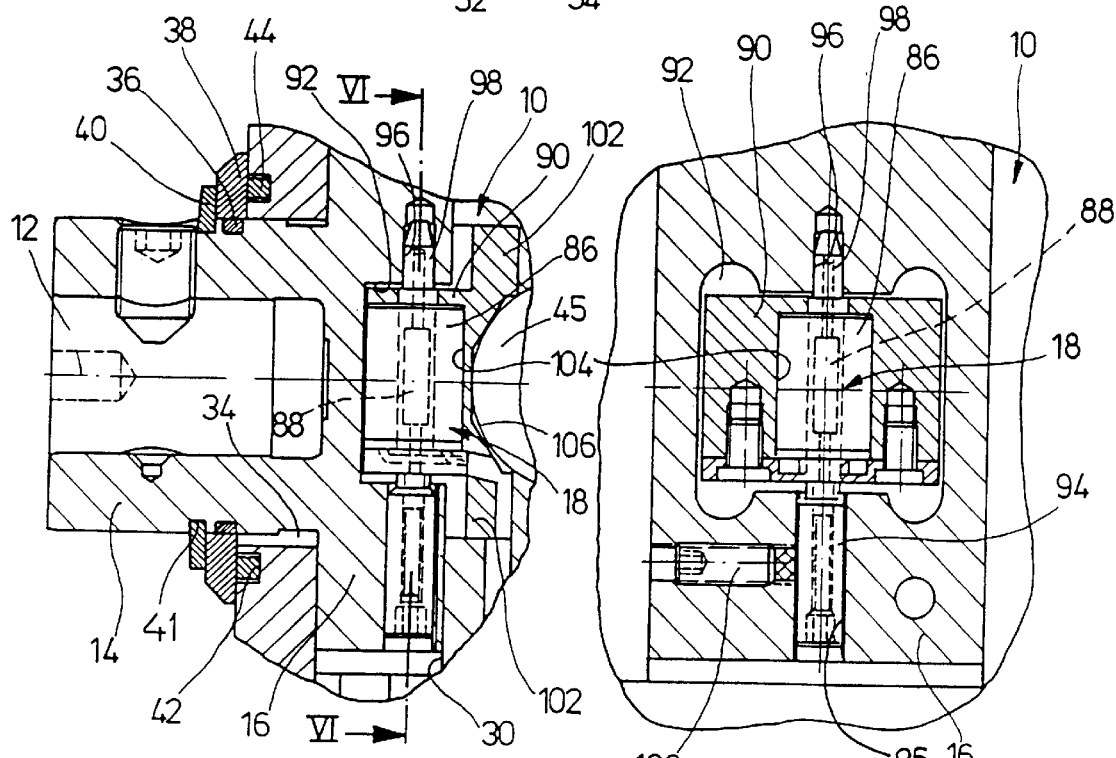
Fig. 5
Fig. 6

TOOL HEAD FOR MACHINE-TOOLS

FIELD OF THE INVENTION

The invention relates to a tool head for use in machine tools. More specifically, the invention is directed to a tool head having a basic body, a tool shank which extends axially beyond the basic body and can be coupled to a rotating machine spindle, having at least one slide which can be adjusted transversely with respect to the basic body axis and has a tool carrier extending beyond the end face, having a measuring device for directly measuring the adjusting path of the slide in relation to the basic body, having measuring electronics arranged in the basic body and connected to the measuring device, having an adjusting motor, preferably electric, arranged in the basic body and acting in the adjusting direction on the slide, and having a power supply device for the measuring electronics and, if appropriate, the adjusting motor.

BACKGROUND OF THE INVENTION

To be able to set the slide and the cutting tool carried by its tool carrier accurately, it is necessary to measure exactly the adjusting path of the slide. For this purpose, it is known (WO91/03345) to measure the adjusting path of the slide in relation to the basic body in a direct way, for example by an optical or capacitive path measuring system, and to evaluate the measured results externally by means of a wireless, preferably optoelectronic, data exchange. Furthermore, it is also known from this document to provide in the basic body an adjusting motor which acts in the adjusting direction on the slide and can likewise be actuated by means of a remote control. The arrangement of the adjusting motor in the tool head has not as yet been satisfactorily achieved. It presents difficulties when one considers that the rotating motions of the tool head and of the rotary motor can be superposed in an undesirable way, in particular during accelerating and braking operations, and that a compact design is desired, in particular in the case of small precision adjustment heads.

Against this background, the invention is based on the object of developing a tool head of the type specified at the beginning which ensures a compact design and trouble free operation.

The way in which this is achieved according to the invention is based on the idea that an isolation of the rotary motion of the adjusting motor and of the tool head can be accomplished in a compact design by the adjusting motor being arranged along with its substantially cylindrical motor housing in a transverse recess of the basic body, aligned transversely with respect to the basic body axis and intersecting the basic body axis, with the motor output shaft aligned parallel with respect to the transverse recess. A further improvement in this respect is accomplished if the transverse recess for receiving the adjusting motor is arranged in the basic body transversely with respect to the adjusting direction of the slide, it also being of advantage here if the path measuring system intersects the basic body axis in the adjusting direction of the slide.

To reduce the undesirable starting current peaks when starting the adjusting motor, the motor housing is clamped on the basic body in a resilient manner, axially and preferably also in the turning direction.

A particularly compact design is advantageously accomplished by the motor output shaft bearing an output gearwheel which reaches in a cup-like manner over the output end of the motor housing, is coupled to an adjusting mechanism of the slide and is advantageously mounted, preferably axially and radially, with its cup inner side on a part of the basic body which reaches axially and radially over the output end of the motor housing and has a central bore for the passing through of the output shaft. This achieves the effect that the radially outward facing teeth of the output gearwheel concentrically embrace the motor housing in the vicinity of the output end. On its cup outer side, the output gearwheel is additionally mounted in a preferably cup-shaped cover part, rigidly connected to the basic body.

An advantageous refinement of the invention provides an adjusting mechanism for the slide which has a spindle, mounted eccentrically in the basic body and bearing a sliding block with oblique toothing, and a counterpiece, provided with complementary oblique toothing and connected rigidly to the slide, which spindle bears a drive pinion meshing with the output gearwheel in the region of the part reaching over the adjusting motor in a cup-like manner.

The output shaft of the adjusting motor is advantageously designed as a polygon, preferably as a hexagon, which engages in a polygonal socket of the output gearwheel, the polygonal socket of the output gearwheel having a greater axial extent than the output shaft, so that it is accessible from the outside with a corresponding polygonal tool for manual adjustment.

Externally, the basic body is expediently surrounded by a preferably metallic casing, in which there are arranged at angular intervals from one another window openings for receiving an infrared transceiver in each case. The rotary driving of the casing takes place by the adjusting motor being adapted such that it can be clamped on the basic body at the end opposite the output side by a clamping cover which has a radially outward extending attachment for engagement in a corresponding recess of the casing.

A preferred alternative or refinement of the invention provides that the measuring device has a plunger coil, arranged in a coil housing which is fixed to the basic body and engages in a pocket-like recess of the slide, and a bar-shaped magnet armature, fixed to the slide and reaching through the pocket-like recess and the plunger coil in the sliding direction of the slide and transversely with respect to the motor housing axis. The measuring system operating on the plunger coil principle has the advantage over the known capacitive measuring system that an absolute path measurement is possible without data loss if the power is disconnected and that installation is less demanding in terms of the tolerances to be maintained.

To permit an adjustment of the path measuring system, the magnet armature is fastened by its one end, overhanging the end face, expediently on an adjusting holder turned into a threaded bore aligned in the sliding direction of the slide, whereas it bears at its end opposite the adjusting holder a guide pin, engaging in a linear guide within the slide. To be able to arrest the magnet armature, once adjustment has taken place, in its zero position on the slide, the adjusting holder can be fixed on the slide by a lock screw which is accessible from the outside in a predetermined sliding position of the slide.

The coil housing, preferably consisting of an antimagnetic material, has laterally overhanging assembly lugs for fastening on the basic body. It expediently has a round, closed coil space for receiving the plunger coil, and is provided on the side facing the motor, preferably in the region between the two assembly lugs, with a recess partially embracing the motor housing around its circumference. The resulting mutual interlocking between coil housing and motor housing permits a compact design of the tool head.

To seal off the interior of the tool head in a fluid-tight manner and nevertheless ensure low-friction sliding of the slide with respect to the basic body, it is proposed according to an advantageous refinement of the invention that the slide with its tool carrier passes through a slot on the end face of the basic body and, outside the slot, bears a washer which is sealed off radially with respect to the slide, is moved along with the slide and can be pressed resiliently against an elastomeric sealing ring, which is arranged in an annular groove on the end face of the basic body and is preferably designed as a square ring, such that between the washer and the basic body there remains a gap which is substantially constant over the circumference of the washer and has a width of 5 to 20 μm. The wall thickness of the washer can expediently be adapted by material removal on its face facing the basic body, thereby setting the predetermined gap width, while the pressing of the washer against the sealing ring may be performed by a spring ring arranged in a circumferential groove on the slide.

To be able to grind the sliding surface of the slide throughout in the basic body and nevertheless ensure stable fitting of the cover, it is proposed according to a further advantageous refinement of the invention that the basic body has a radially continuous sliding surface for the slide without any end limitations, and that there is arranged on the side of the sliding block a spacer between the basic body and the cover part. The spacer also ensures that the retroactive forces from the oblique toothing of the adjusting mechanism for the slide can be absorbed and introduced into the basic body.

BRIEF DESCRIPTION OF THE DRAWINGS

The invention is explained in more detail below with reference to an exemplary embodiment represented diagrammatically in the drawings, in which:

FIG. 4 shows a section along the section line IV—IV of FIG. 3;

FIG. 5 shows an enlarged detail from FIG. 2 with sectioned length measuring device;

FIG. 6 shows a section along the section line VI—VI of FIG. 5.

DETAILED DESCRIPTION

Figure 1:
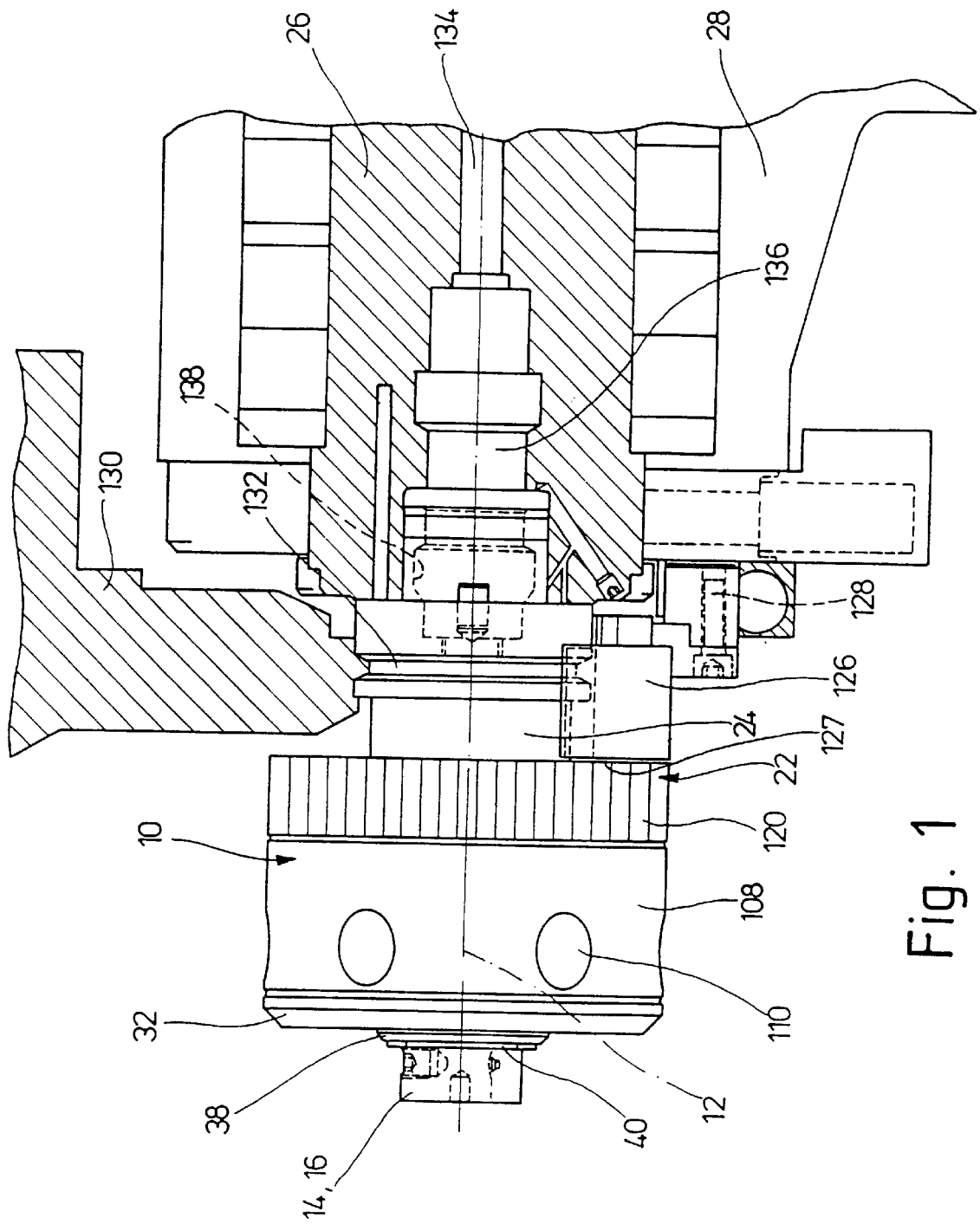
FIG. 1 shows a side view of a precision turning head with adjusting mechanism, remote control and external power supply, clamped in a machine spindle.
Figures 2, 3:
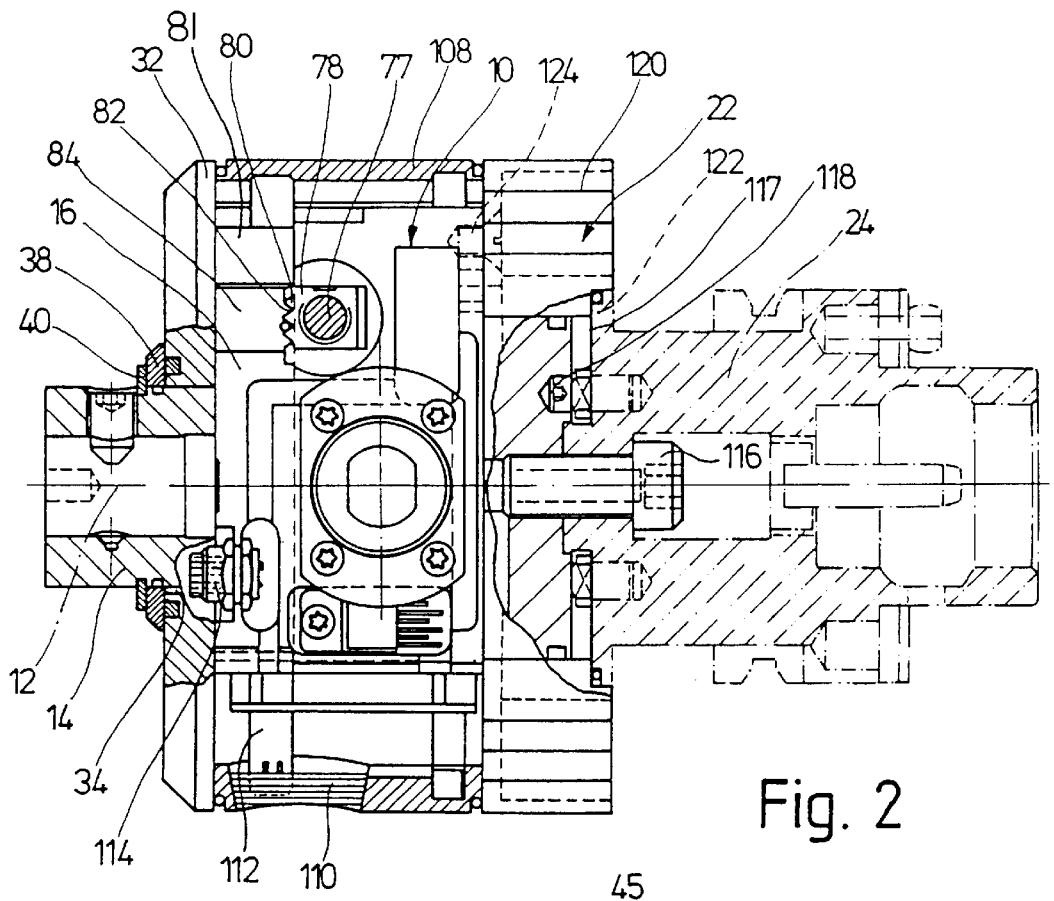
FIG. 2 shows a longitudinal section through the precision turning head according to FIG. 1 with tool shank.
FIG. 3 shows a longitudinal section through the precision turning head turned through 90° with respect to FIG. 2.

The precision turning head represented in the drawing essentially comprises a basic body 10, a slide 16 which is adjustable in relation to the basic body 10 transversely with respect to the axis of rotation 12 of the precision turning head and bears a tool carrier 14 for a cutting tool, a measuring device 18 for directly measuring the adjusting path of the slide 16 in relation to the basic body 10, an electric adjusting motor 20 acting on the slide in the adjusting direction, a power supply device 22 and a tool shank 24, which extends axially beyond the basic body 10 and can be coupled to a machine spindle 26 of a machine tool 28.

The slide 16 is arranged in the basic body 10 in a continuous guide groove 30 which is aligned transversely with respect to the basic body axis 12, has no end limitations and is bounded from the outside by means of a cover part 32 rigidly connected to the basic body 10 at the end by means of spacers 81. The slide 16 passes with its tool carrier 14 through a slot 34 of the cover part 32 to the outside and, outside the slot 34, bears a washer 38 which is sealed off radially with respect to the tool carrier 14 by an annular sealing member 36; the tool carrier 14 has a circumferential groove 41 receiving a spring ring 40 thereon; and the washer 38 moves along with the slide and can be pressed with the aid of the spring ring 40 resiliently against a square ring 44, which is arranged in an annular groove 42 of the cover part, such that between the washer 38 and the cover part 32 there remains a gap which is substantially constant over the circumference of the washer 38 and has a width of 10 μm. This measure avoids the metallic washer 38 rubbing on the metallic cover part 32 during sliding of the slide.

The adjusting motor 20 has a substantially cylindrical motor housing 45, which is arranged in a transverse recess of the basic body 10 running transversely with respect to the sliding direction of the slide 16 and the basic body axis 12 and intersecting the basic body axis 12. The axially overhanging output shaft 48 is designed as a hexagon. It bears an output gearwheel 50 of a cup-shaped design, the hexagonal socket 52 of which is longer than the output shaft 48, so that, when the screw plug 54 is removed, a corresponding hexagonal tool can be inserted from the outside into the hexagonal socket 52 for manual adjustment of the output gearwheel. The output gearwheel 50 reaches with its inwardly facing, externally toothed casing part 56 over the output end of the motor housing 45 and is radially supported there on the outside by means of a sliding bearing 60 on a sleeve attachment 58 receiving the relevant housing end. Furthermore, the output gearwheel 50 is axially mounted with its cup inner side on the sleeve attachment 58 by means of a rolling bearing 62, whereas it is mounted on the cup outer side with its hollow pin 63, having the hexagonal socket 52, in a rotary bearing, designed as rolling bearing 64, of a cup-shaped cover part 66 fixed to the basic body. On its side opposite the output side, the adjusting motor 20 is axially clamped by a clamping cover 68 and an elastomeric ring 70 against the output-side sleeve attachment 58, the torsional securement of the motor housing 45 taking place by means of the eccentric pins 72 arranged on the output side. The axially resilient clamping with torsional resilience allows smooth starting of the motor, as a result of which starting current peaks can be reduced. In consideration of the centrifugal force acting on the motor, this applies in particular whenever the center of gravity of the adjusting motor is radially shifted with respect to the axis of rotation 12 of the basic body 10 toward the resilient ring 70.

The output gearwheel 50 is used for driving an eccentrically arranged adjusting mechanism for the slide which has a drive pinion 76, meshing with the toothed rim 74 of the output gearwheel 50, and a threaded spindle 77, rigidly connected to the said pinion. Guided on the threaded spindle is a sliding block 78 with oblique toothing 80, which meshes with complementary oblique toothing 82 of a counterpiece 84 arranged on the slide 16.

The measuring device 18 has a plunger coil 86, fixed to the basic body, and a bar-shaped magnet armature 88, fixed to the slide and reaching into the plunger coil 86 in the sliding direction. The plunger coil 86 is arranged essentially centrally in the basic body 10 in a coil housing 90 which is fixed to the basic body and, from the motor side, reaches together with the plunger coil into a pocket-like recess 92 of the slide. The magnet armature 88 is fastened by its one end, overhanging at the end face, on an adjusting holder 94 turned into a threaded bore 95 aligned in the sliding direction of the slide 16, whereas it bears at its end opposite the adjusting holder 94 a guide pin 98, engaging in a linear guide (bore) 96 within the slide 16. The adjusting holder 94 can be fixed on the slide 16 by a lock screw 100 which is accessible from the outside in a predetermined position of the slide. The coil housing is provided with laterally overhanging assembly lugs 102 and has on its side opposite the coil space 104 a recess 106 which is arranged in the region between the two assembly lugs 102 and partially embraces the motor housing 45 around its circumference.

The basic body 10 is embraced around its circumference by a casing ring 108 of metal or plastic, in which there are arranged distributed at equal angular intervals over the circumference windows 110 for infrared transceivers 112. The transceivers provide the wireless data exchange between the tool head and an external, computer-aided remote control device. The data exchange, for example for adjusting purposes, may also take place galvanically via the interface 114.

The tool shank 24 for the connection to the machine spindle 26 is axially fastened by a single central screw 116 in a shank holder 117 on the basic body 10. The eccentrically arranged fitting pins 118 in this case ensure the torsional securement and torque transmission.

On the side of the tool shank 24, there is additionally arranged an annular coil housing 120, which is fastened on the basic body together with the tool shank 24 by means of the radially overhanging collar 122 of the latter, using the central screw 116. The torsional securement of the coil housing 120 takes place by means of the driver bolts 124, which are designed as countersunk screws and engage with their shank in corresponding bores of the basic body.

In the coil housing 120 there is a secondary coil, which is embedded in a mechanically loadable casting compound of plastic or synthetic resin and has associated stabilization electronics, which constitute part of an inductive transmission link of the power supply device 22 and ensure the power supply to the adjusting motor 20 and to the electronic circuits contained in the tool head. In principle, it is possible to use the induction link also for bidirectional data exchange, in that the data signals are modulated onto the induction current in both directions, if appropriate.

The primary coil of the inductive transmission link is arranged in a coil housing 126 on the stator side, which housing reaches into the free interspace between the end face of the machine spindle 26 and the end face of the coil housing 120 on the tool head side, radially outside the tool shank 24. For setting the air gap between the primary coil and the secondary coil, the coil housing 126 on the stator side is arranged on a holder 128, fixed to the stator, adjustably both in its distance from the coil housing 120 on the tool head side and in its rotational position about an axis parallel to the axis of rotation 12. The holder 128 with the coil housing 126 may also be fitted subsequently onto an existing machine tool. The coil housing 126 on the stator side extends only over a partial circumference of the tool shank and leaves the predominant part of the shank circumference free for the access of a tool gripper 130 for automatic tool changing. During tool changing, the tool head is grasped at the gripper channel 132 by the tool gripper 130 from the side opposite the coil housing 126 on the stator side and, with the tool coupling released, is displaced axially in relation to the machine spindle 26. The coupling of the tool head to the machine spindle 26 in this case takes place by means of a clamping mechanism 136 which can be activated on the machine side by means of the draw bar 134 and engages from the machine side in the cavity 138 of the tool shank 24 and couples the tool head to the machine spindle 26, establishing end face bracing and radial bracing.

To sum up, the following may be stated: the invention relates to a tool head, in particular a precision adjustment head, for use in machine tools. The tool head can be coupled to a rotating machine spindle 26, has a slide 16 which can be adjusted transversely with respect to the basic body axis 12 and has a tool carrier 14 extending beyond the end face, a measuring device 18 for directly measuring the adjusting path of the slide 16 in relation to the basic body 10, an adjusting motor 20 acting in the adjusting direction on the slide 16, and an external power supply device 22 for electronics, integrated in the tool head, and the adjusting motor 20. To ensure a compact design along with high adjusting accuracy, the adjusting motor 20 is arranged along with its cylindrical motor housing 45 in a transverse recess 46 of the basic body 10, aligned transversely with respect to the adjusting direction of the slide 16 and transversely with respect to the basic body axis 12 and intersecting the basic body axis 12, with the motor output shaft 48 aligned parallel with respect to the transverse recess 46.

The embodiments of the invention in which an exclusive property or privilege is claimed are defined as follows:

1. A tool head for use in machine tools, comprising a body defining a body axis, a tool shank connected to the body which extends axially beyond the body and is adapted to be coupled to a rotating machine spindle of a machine tool, at least one slide positioned in the body and adapted to be adjusted transversely with respect to the body axis in an adjusting direction, a tool carrier connected to the slide extending beyond an end face of the body, a measuring device for directly measuring a position of the slide in relation to the body, measuring electronics arranged in the body and connected to the measuring device, an adjusting motor arranged in the body and acting on the slide to adjust the slide in the adjusting direction, the adjusting motor having an output shaft, a power supply device for supplying power to the measuring electronics and the adjusting motor, and a transverse recess positioned in the body and adapted to receive the adjusting motor therein, the transverse recess being aligned transversely to the body axis and intersecting the body axis, the output shaft of the adjusting motor being aligned parallel with respect to the transverse recess.

2. The tool head as claimed in claim 1, wherein the transverse recess for receiving the adjusting motor is arranged in the body transversely with respect to the adjusting direction of the slide.

3. The tool head as claimed in claim 1, wherein the adjusting motor has a substantially cylindrical motor housing clamped on the body in an axially resilient manner, the motor housing being positioned in the transverse recess.

4. A tool head for use in machine tools, comprising a body defining a body axis, a tool shank connected to the body which extends axially beyond the body and is adapted to be coupled to a rotating machine spindle of a machine tool, at least one slide positioned in the body and has an adjusting mechanism for adjusting the slide transversely with respect to the body axis in an adjusting direction, a tool carrier connected to the slide extending beyond an end face of the body, a measuring device for directly measuring a position of the slide in relation to the body, measuring electronics arranged in the body and connected to the measuring device, an adjusting motor arranged in the body and acting on the slide to adjust the slide in the adjusting direction, the adjusting motor having an output shaft, a power supply device for the measuring electronics and the adjusting motor, a transverse recess positioned in the body and adapted to receive the adjusting motor therein, the transverse recess being aligned transversely to the body axis and intersecting the body axis, the output shaft of the adjusting motor being aligned parallel with respect to the transverse recess, the adjusting motor having a motor housing, and an output gearwheel being supported by the output shaft, the output gear wheel extending in a cup-like manner over an output end of the motor housing and is coupled to the adjusting mechanism of the slide.

5. The tool head according to claim 4, wherein the output gearwheel is mounted axially and radially with an inner side thereof on a part of the body which extends axially and in the circumferential direction over an output end of the motor housing and has a central bore for passing therethrough the output shaft.

6. The tool head as claimed in claim 4, wherein a cup-shaped cover part is rigidly connected to the body, and wherein a bearing journal mounts the output gearwheel in the cup-shaped cover part.

7. The tool head as claimed in claim 4, wherein the output gearwheel has a radially outward facing toothed rim concentrically embracing the motor housing in the vicinity of an output end of the motor housing.

8. The tool head as claimed in claim 4, wherein the adjusting mechanism has a threaded spindle, a sliding block, a counterpiece, and a drive pinion, the threaded spindle being mounted eccentrically in the body and having oblique teeth supporting the sliding block, the counterpiece having complementary oblique teeth and being connected rigidly to the slide, the threaded spindle supporting the drive pinion meshing with a part of the output gearwheel in a region thereof extending over the motor housing in a cup-like manner.

9. The tool head as claimed in claim 8, wherein a cover part covers an end of the body and the body has a radially continuous guide groove for the slide without any end limitations, and wherein a spacer is arranged on the side of the sliding block between the body and the cover part.

10. The tool head as claimed claim 4, wherein the output shaft of the adjusting motor is designed as a polygon which engages in a polygonal socket of the output gearwheel, the polygonal socket of the output gearwheel having a greater axial length than the output shaft and being accessible from outside with a corresponding polygonal tool.

11. The tool head as claimed in claim 1, wherein the body is surrounded annularly by a metallic casing, and has window openings for receiving an infrared transceiver in each window opening, the window openings being arranged at angular internals from one another.

12. The tool head as claimed in claim 11, wherein a clamping cover clamps the adjusting motor on the body at an end opposite the output shaft, the clamping cover having a radially outward extending attachment for engagement in a corresponding recess of the casing.

13. The tool head as claimed in claim 1, wherein the measuring device has a plunger coil fixed to the body, and a bar-shaped magnet armature fixed to the slide and reaching through the plunger coil in the adjusting direction of the slide.

14. The tool head as claimed in claim 13, wherein the slide has a pocket-like recess, and wherein the plunger coil is arranged in a coil housing which is fixed to the body and engages in the pocket-like recess of the slides, and the bar-shaped magnet armature extends through the pocket-like recess and the plunger coil in the adjusting direction of the slide.

15. The tool head as claimed in claim 14, wherein the coil housing has laterally overhanging assembly lugs for fastening onto the body.

16. The tool head as claimed in claim 14, wherein the coil housing has a closed coil space.

17. The tool head as claimed in claim 15, wherein the coil housing has a recess which is arranged in a region between two of the assembly lugs, the recess partially embracing the motor housing around the circumference thereof.

18. The tool head as claimed in claim 14, wherein an adjusting holder is threadedly bored into the body and is aligned in the adjusting direction of the slide, and wherein the magnet armature is fastened by one end thereof on the adjusting holder, the magnet armature extending from an end face of the adjusting holder.

19. The tool head as claimed in claim 18, wherein the slide has a linear guide, and wherein a guide pin is positioned at an end of the magnet armature at the end opposite the adjusting holder engaging in the linear guide within the slide.

20. The tool head as claimed in claim 18, wherein a lock screw fixes the adjusting holder on the slide, the lock screw being accessible from outside in a predetermined sliding position of the slide.

21. The tool head as claimed in claim 1, wherein a cover part is connected to the end face of the body, the end face of the body has a slot therein, the cover part has an annular groove therein, an elastomeric sealing ring being arranged in the annular groove, the tool carrier passes through the slot, a washer is supported outside the slot on the tool carrier and is sealed off radially with respect to the tool carrier, the washer being moved along with the slide and being pressed resiliently against the elastomeric sealing ring, and a gap which is substantially constant over the circumference of the washer being positioned between the washer and the cover part and has a width of 5 to 20 $\mu$m.

22. The tool head as claimed in claim 21, wherein the washer has means for setting the width of the gap.

23. The tool head as claimed in claim 21, wherein a spring ring is arranged in a circumferential groove on the tool carrier for pressing the washer against the sealing ring.

\* \* \* \* \*